Figure 1:
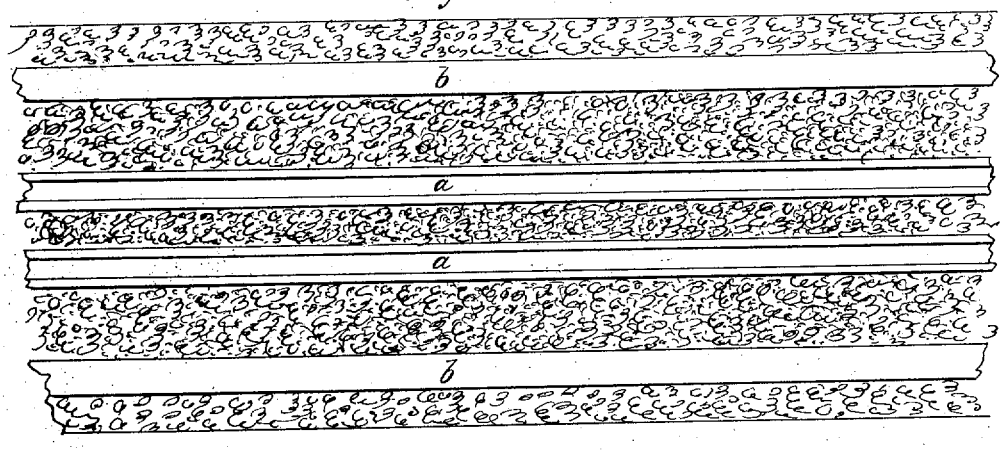
Figure 2:
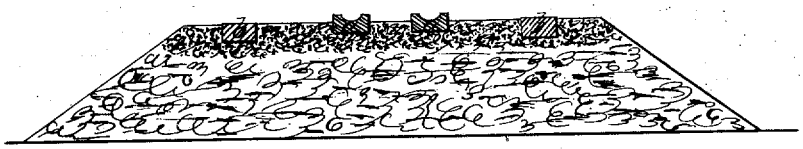

7656X

J. S. WILLIAMS.

TRACK ROAD.

Patented June 29, 1833.

THE NORRIS PETERS CO., PHOTO-LITHO., WASHINGTON, D. C.

[illegible]X7656 June 29, 1833

[illegible] S. Williams of Hamilton County State of Ohio

Letters Patent

The schedule referred to in these Letters Patent and making
part of the same, containing a description in the words of
the said John S. Williams himself of his improvement in Roads To all to whom these presents shall come Be it known that I, John S. Williams of Hamilton County
and State of Ohio have invented a new and useful improve-
ment in the construction of Roads, whereby some of the advan-
tages derived from rail roads are extended to the common
carriages of burthen or pleasure, that travel any road so improved
and that the following is a full and exact description of my said
improvement, — I lay two continuous lines of timber or other suitable
material, lengthwise on said road such a distance apart as to
form tracks for the wheels of such vehicles, as are in general use
upon the road so improved. I furrow, gutter, or groove one of
these tracks in order to receive and guide the wheel or wheels
on one side of the carriage travelling thereon. These grooves
or gutters may be made in the timber or other material before
it is laid upon the road or afterwards in either by hand or by
machinery propelled by any suitable motive power or they may
be formed by attaching cheeks or sides to a plain surface The other track ought to be laid on a level with the
bottom of the furrow or gutter above mentioned. — [illegible]
I make plain [illegible] ought to be of such a width as to allow for
the variation of span some times given to the wheels of
different kinds of carriages in some places so that while the
wheels of one side of the vehicle shall remain within the groove
of one track, the other wheel shall remain on the [illegible]
[illegible] track notwithstanding the different span to which

X 7656 they may be [illegible] — These tracks may be bedded or laid [illegible] or upon stones, gravel, clay, or any material of which the surface of the road is formed and the pieces of which they are constructed may be connected by dowels, or clamps, or laid upon transverse blocks or cross pieces, which may or may not, extend from one to the other, —

Scrapers may be attached to some of the carriages passing on said tracks for the purpose of clearing them of stones, earth or other matter, which might tend to obstruct the wheels or injure the tracks —

Where there is much travelling upon a road so improved I lay two sets or four continuous lines of tracks one set for the going and one for the returning carriage, — This will be found most convenient, altho' to turn out of the tracks when carriages meet will not be attended with difficulty as one side only of the turning out carriage would have to be raised over a small obstacle —

I am aware that some of the advantages of such a track road may be gained by laying timber &c as above and by furrowing, guttering or rabbeting both tracks to guide the wheels but I prefer to gutter or groove one only —

What I claim as my invention or improvement is the laying of tracks of wood or other suitable material, one of which shall be furrowed grooved or guttered in the manner and for the purpose herein before set forth —

Witness
Isaac G. Burnet
Francis Carr

John S. Williams

Ex [illegible]

(Patented June 29. 1832)
(Drawing made from Specification)

([illegible])